US012059801B2

United States Patent
Jones et al.

(10) Patent No.: US 12,059,801 B2
(45) Date of Patent: Aug. 13, 2024

(54) DIAGNOSTIC STATION FOR PRODUCTION LINE

(71) Applicant: Transitions Optical, Ltd., Tuam (IE)

(72) Inventors: Douglas B. Jones, Kilcahill (IE); Jared L. Snow, Fort Lorenzo (IE); Willard Beamer, Palmetto, FL (US); Joseph C. Stitt, Craughwell (IE)

(73) Assignee: Transitions Optical, Ltd., Tuam (IE)

( * ) Notice: Subject to any disclaimer, the term of this patent is extended or adjusted under 35 U.S.C. 154(b) by 947 days.

(21) Appl. No.: 17/041,799

(22) PCT Filed: Mar. 28, 2018

(86) PCT No.: PCT/EP2018/057907
§ 371 (c)(1),
(2) Date: Sep. 25, 2020

(87) PCT Pub. No.: WO2019/185133
PCT Pub. Date: Oct. 3, 2019

(65) Prior Publication Data
US 2021/0023723 A1  Jan. 28, 2021

(51) Int. Cl.
*B25J 19/00* (2006.01)
*G01L 5/00* (2006.01)
(Continued)

(52) U.S. Cl.
CPC ........... *B25J 19/0095* (2013.01); *G01L 5/009* (2013.01); *H04N 7/18* (2013.01); *H04N 23/90* (2023.01); *B25J 5/02* (2013.01); *B25J 9/14* (2013.01)

(58) Field of Classification Search
None
See application file for complete search history.

(56) References Cited

U.S. PATENT DOCUMENTS

| 3,716,910 A | 2/1973 | Eggert |
| 3,747,737 A | 7/1973 | Brooke |

(Continued)

FOREIGN PATENT DOCUMENTS

| CN | 102171007 A | * | 8/2011 | ............ B25J 13/087 |
| CN | 104174148 A |   | 12/2014 | |

(Continued)

OTHER PUBLICATIONS

Title: Force Measuring; URL: https://www.drivetest.de/en/force-measuring/measurement-devices/; Date: Jun. 29, 2017 (Year: 2017).*

*Primary Examiner* — Jill E Culler
*Assistant Examiner* — Ruben C Parco, Jr.
(74) *Attorney, Agent, or Firm* — The Webb Law Firm

(57) ABSTRACT

A diagnostic station for inspecting an article transport vehicle movable along a guideway has a diagnostic module associated with the guideway and configured to receive the article transport vehicle when the article transport vehicle is in an inspection position along the guideway. The diagnostic module has at least one of the following: a grip testing substation having at least one force sensor configured for measuring a force exerted by a closure mechanism of the article transport vehicle in a closed position, a pressure testing substation in communication with a source of pressurized air and configured for pressurizing and depressurizing the closure mechanism, and an optical inspection substation having at least one camera configured for capturing image data of the article transport vehicle.

15 Claims, 8 Drawing Sheets

(51) Int. Cl.
*G01M 99/00* (2011.01)
*H04N 7/18* (2006.01)
*H04N 23/90* (2023.01)
*B25J 5/02* (2006.01)
*B25J 9/14* (2006.01)

(56) References Cited

U.S. PATENT DOCUMENTS

| | | |
|---|---|---|
| 4,852,415 A | 8/1989 | Bogatzki et al. |
| 6,076,875 A | 6/2000 | Neff et al. |
| 6,623,669 B1 | 9/2003 | Slack et al. |
| 9,604,563 B1 * | 3/2017 | Wilson, II ............. G06Q 40/08 |
| 10,804,123 B2 | 10/2020 | Junker et al. |
| 2005/0103121 A1 * | 5/2005 | Chen ................. H01L 21/68707 |
| | | 73/856 |
| 2010/0129181 A1 | 5/2010 | Blasiak et al. |
| 2013/0084157 A1 | 4/2013 | Staunton et al. |
| 2013/0104664 A1 | 5/2013 | Chevalier, Jr. et al. |

FOREIGN PATENT DOCUMENTS

| | | | | |
|---|---|---|---|---|
| DE | 102015013494 B3 * | 4/2017 | ........... | B65G 47/915 |
| DE | 102015013494 B3 | 4/2017 | | |
| DE | 102017004367 A1 | 11/2017 | | |
| JP | H9100020 A | 4/1997 | | |
| JP | 2001233437 A | 8/2001 | | |
| JP | 2007322402 A * | 12/2007 | | |

* cited by examiner

DIAGNOSTIC STATION FOR PRODUCTION LINE

CROSS-REFERENCE TO RELATED APPLICATION

This application is the United States national phase of International Application No. PCT/EP2018/057907 filed Mar. 28, 2018, the disclosure of which is hereby incorporated by reference in its entirety.

BACKGROUND OF THE INVENTION

Field of the Invention

The present invention relates to a diagnostic station for a production line. In particular, the present invention relates to a diagnostic station for a production line having one or more article transport vehicles, wherein the diagnostic station is configured for inspecting or testing at least one characteristic of the one or more article transport vehicles.

Description of the Related Art

With optical articles, such as lenses, one or more surfaces may be subjected to a treatment to enhance the overall performance and function of the optical articles. Examples of such treatments include the formation of one or more coatings on a surface of an optical substrate.

In order to manufacture a coated optical article from an uncoated optical substrate, a variety of manufacturing techniques have been developed. For smaller batches, it may be economical to manufacture coated optical articles by passing a single optical article through a plurality of discrete processing stations, such as a washing station, a coating station, and a curing station, before a subsequent optical article is processed. In large scale operations, optical articles may be processed on an automated production line configured for processing hundreds of optical articles per hour. In some examples, each optical article may be loaded onto a transport vehicle that moves the optical article to various processing stations on the production line.

While such transport vehicles provide a convenient means for transporting optical articles along the production line, they require periodic maintenance to prevent unscheduled downtime of the production line in case of a breakdown of the transport vehicle. For example, a breakdown of a single transport vehicle while in use on a production line may lead to a shutdown of the entire production line until the broken transport vehicle is repaired.

It would be desirable to develop a new optical article transport system for moving optical articles along the production line wherein the transport vehicles can be inspected for their operating condition to prevent the breakdown of the transport vehicle while in use on the production line.

SUMMARY OF THE INVENTION

In accordance with the present invention, there may be provided a diagnostic station for inspecting an article transport vehicle movable along a guideway. The diagnostic station may have a diagnostic module and be configured to receive the article transport vehicle when the article transport vehicle is in an inspection position along the guideway. The diagnostic module may have at least one of the following: a grip testing substation having at least one force sensor configured for measuring a force exerted by a closure mechanism of the article transport vehicle in a closed position, a pressure testing substation in communication with a source of pressurized air and configured for pressurizing and depressurizing the closure mechanism, and an optical inspection substation having at least one camera configured for capturing image data of the article transport vehicle.

In accordance with the present invention, a controller having at least one processor may be provided, wherein the at least one processor may be programmed or configured for determining whether the image data has at least one predetermined characteristic of the article transport vehicle. In response to determining that the image data has the at least one predetermined characteristic, the at least one processor may be programmed or configured for generating at least one notification about a status of the article transport vehicle. The at least one predetermined characteristic of the article transport vehicle may be a presence or an absence of at least one physical feature of the article transport vehicle. The at least one predetermined characteristic of the article transport vehicle may be a three-dimensional position of at least one physical feature of the article transport vehicle relative to the diagnostic module. The at least one predetermined characteristic of the article transport vehicle may be a color of at least one of a pair of gripping arms of the closure mechanism.

In accordance with the present invention, the at least one camera may have a first camera configured for capturing image data of a top portion of the article transport vehicle and a second camera configured for capturing image data of a side portion of the article transport vehicle. The second camera may be positioned at an angle of 40° to 50° relative to a longitudinal axis of the article transport vehicle extending in a direction of a pair of gripping arms of the closure mechanism. The at least one force sensor may be movable between a first position out of direct physical contact with a pair of gripping arms of the closure mechanism and a second position in direct physical contact with the pair of gripping arms when the gripping arms are in the closed position. A controller having at least one processor may be provided, wherein the at least one processor may be programmed or configured for determining whether the force exerted by a pair of gripping arms of the closure mechanism in the closed position is outside a predetermined range. In response to determining that the force is outside the predetermined range, the at least one processor may be configured for generating at least one notification about a status of the article transport vehicle.

In accordance with the present invention, the pressure testing substation may be configured for actuating a check valve of the closure mechanism. The pressure testing substation may be configured for pressurizing the closure mechanism of the article transport vehicle to move a pair of gripping arms from the closed position to an open position. A controller having at least one processor may be programmed or configured for measuring whether a length of time during movement of the gripping arms between the closed position and the open position is outside a predetermined range. In response to determining that the length of time is outside the predetermined range, the at least one processor may be programmed or configured for generating at least one notification about a status of the article transport vehicle.

In accordance with the present invention, at least one of the grip testing substation and the pressure testing substation may have a clamping mechanism for retaining the article transport vehicle in the inspection position. The clamping mechanism may be movable between a first position out of direct physical contact with the article transport vehicle and a second position in direct physical contact with the article transport vehicle.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-10, like characters refer to the same components and elements, as the case may be, unless otherwise stated.

DETAILED DESCRIPTION OF THE INVENTION

Figure 1:
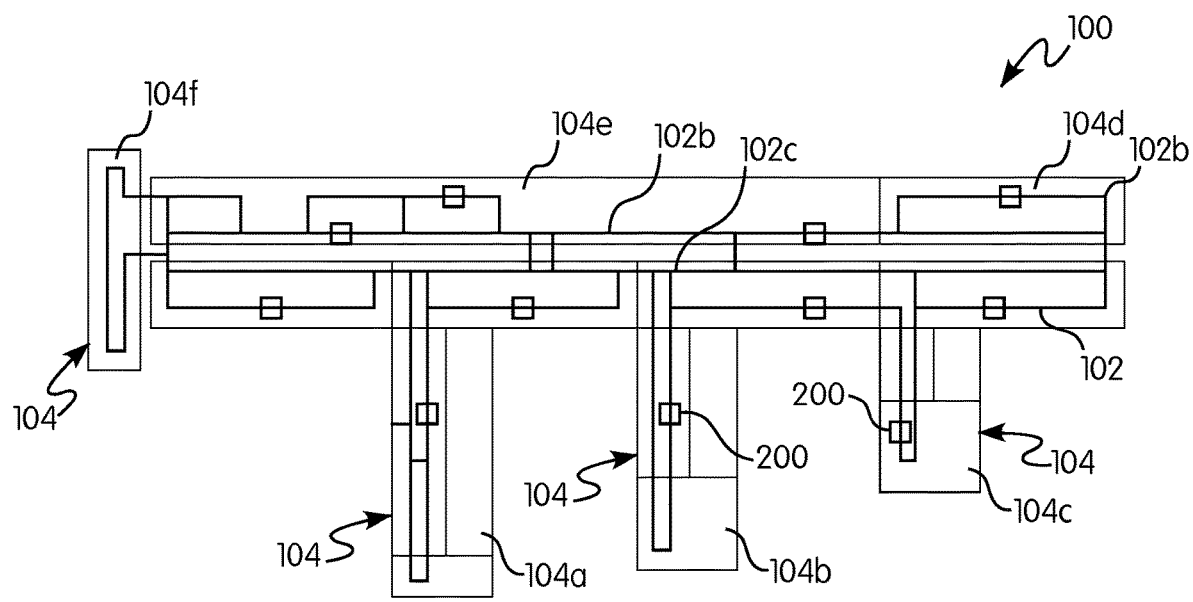
FIG. 1 is a schematic representation of an optical article production line in accordance with some examples of the present invention.

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The term "optical" means pertaining to or associated with light and/or vision. For example, an optical element, article, or device can be chosen from ophthalmic elements, articles, and devices, display elements, articles, and devices, visors, windows, and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "transparent", such as used in connection with a substrate, film, material, and/or coating, means that the indicated substrate, film, material, and/or coating has the property of transmitting visible light without appreciable scattering so that objects lying beyond are visibly observable.

As used herein, the terms "visible light" or "visible radiation" means electromagnetic radiation having a wavelength in the range of 380 nm to 780 nm.

As used herein, the term "coating" means a supported film derived from a flowable coating material, which can optionally have a uniform thickness, and specifically excludes polymeric sheets. The terms "layer" and "film" each encompass both coatings (such as a coating layer or a coating film) and sheets, and a layer can include a combination of separate layers, including sub-layers and/or over-layers. The verb "coating" means, within appropriate context, the process of applying a coating material (or materials) to the substrate to form a coating (or coating layer).

As used herein, the terms "cure", "cured", and related terms, mean that at least a portion of the polymerizable and/or crosslinkable components that form a curable composition are at least partially polymerized and/or crosslinked. In accordance with some examples, the degree of crosslinking can range from 5% to 100% of complete crosslinking. In accordance with some further examples, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the term "IR" means infrared, such as infrared radiation. The term "infrared radiation" means electromagnetic radiation having a wavelength in the range of greater than 780 nm to 1,000,000 nm.

As used herein, the term "UV" means ultraviolet, such as ultraviolet radiation. The terms "ultraviolet radiation" and "ultraviolet light" mean electromagnetic radiation having a wavelength in the range of 100 nm to less than 380 nm.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of the following examples of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

With initial reference to FIG. 1, a production line 100 has a guideway 102 configured for supporting at least one optical article transport vehicle 200 (hereinafter referred to as "transport vehicle 200"). The production line 100 of the present invention can, with some examples, be used for the production of optical articles, such as lenses. Examples of optical articles that can be processed on the production line 100 of the present invention include, but are not limited to, optical lenses, ophthalmic lenses, and/or prescription lenses, which in each case can be finished lenses, unfinished lenses, or lens blanks. In some examples, the production line 100 of the present invention can be at least partially automated and optionally incorporated into art-recognized product tracking and control systems.

With continued reference to FIG. 1, the production line 100 has a plurality of processing stations 104 positioned along the guideway 102. Each processing station 104 is configured for performing a predetermined processing step on an optical article carried by the transport vehicle 200. Each transport vehicle 200 may be configured to be independently moved along the guideway 102 between various processing stations 104. In some examples, the production line 100 may be configured such that a first portion of the transport vehicles 200 move through a first subset of the processing stations 104, while a second portion of the transport vehicles 200 move through a second subset of the processing stations 104. In some examples, the first and second subsets of processing stations 104 may be mutually exclusive. In other examples, the first and second subsets of processing stations 104 may at least partially overlap.

The guideway 102 may have a closed loop configuration or an open configuration. In a closed loop configuration, such as shown in FIG. 1, each transport vehicle 200 is movable in an infinite loop, while an open configuration (not shown) requires loading each transport vehicle 200 at a first end of the production line 100 and unloading each transport vehicle 200 at a second end of the production line 100. In some examples, the guideway 102 may be a moving belt, track, or other moving mechanism. A position of the transport vehicle 200 may be fixed on the moving guideway 102. Alternatively, the transport vehicle 200 may be movable along the moving guideway 102. In other examples, the guideway 102 may be a stationary track with the transport vehicle 200 movable along the guideway 102. Each transport vehicle 200 may be configured for uni-directional or bi-directional movement along the guideway 102.

With continued reference to FIG. 1, the guideway 102 has one or more track sections 102a, one or more turn sections 102b, and one or more merging/diverging sections 102c. The guideway 102 may have a modular layout, wherein the arrangement of the one or more track sections 102a, one or more turn sections 102b, and one or more merging/diverging sections 102c can be changed to change a layout of the guideway 102. In some examples, the track sections 102a may be linear or curved, and may extend in a single plane or may extend from a first vertical plane to a second vertical plane. In some examples, the one or more turn sections 102b may be turns having constant or increasing/decreasing radius.

Figure 2:
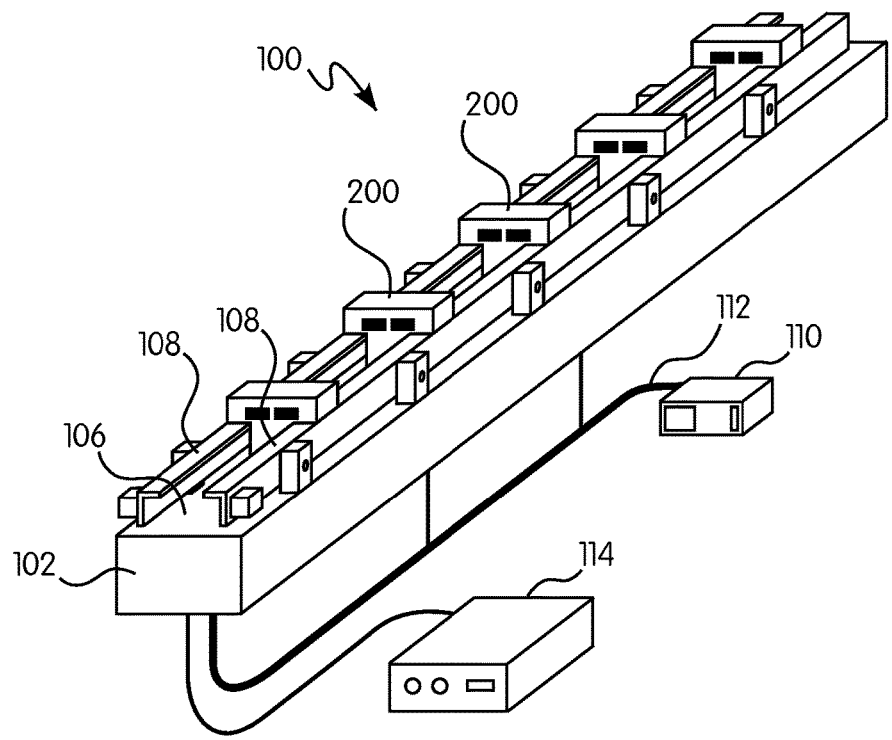
FIG. 2 is a representative perspective view of a portion of a guideway for use with the optical article production line according to some examples of the present invention.

With reference to FIG. 2, a portion of the guideway 102 for use with the production line 100 is illustrated in detail. In some examples, the guideway 102 has a guide channel 106 defined by a pair of rails 108. In other examples, the guideway 102 may be a single rail 108. The guide channel 106 is shaped to receive at least a portion of the transport vehicle 200. While FIG. 2 illustrates a linear guideway 102 extending in a single plane, curved guideways 102 and/or guideways 102 extending in more than one plane are also contemplated. In some examples, at least one of the rails 110 of the guideway 102 may provide suspension, guiding, and propelling to the transport vehicles 200. For example, at least one of the rails 108 may have one or more electromagnets that magnetically interact with permanent magnets in the transport vehicles 200 to provide a vertical suspension force, a lateral guidance force, and a longitudinal propulsive force. Power is supplied to the electromagnets from a power supply 110 via one or more power cables 112. A guideway controller 114 is configured for selectively energizing the electromagnets to control the movement of the transport vehicles 200 along the guideway 102. In some examples, the guideway 102 may be a magnetic guideway available from MagneMotion (Rockwell Automation) of Devens, Massachusetts.

Figure 3:
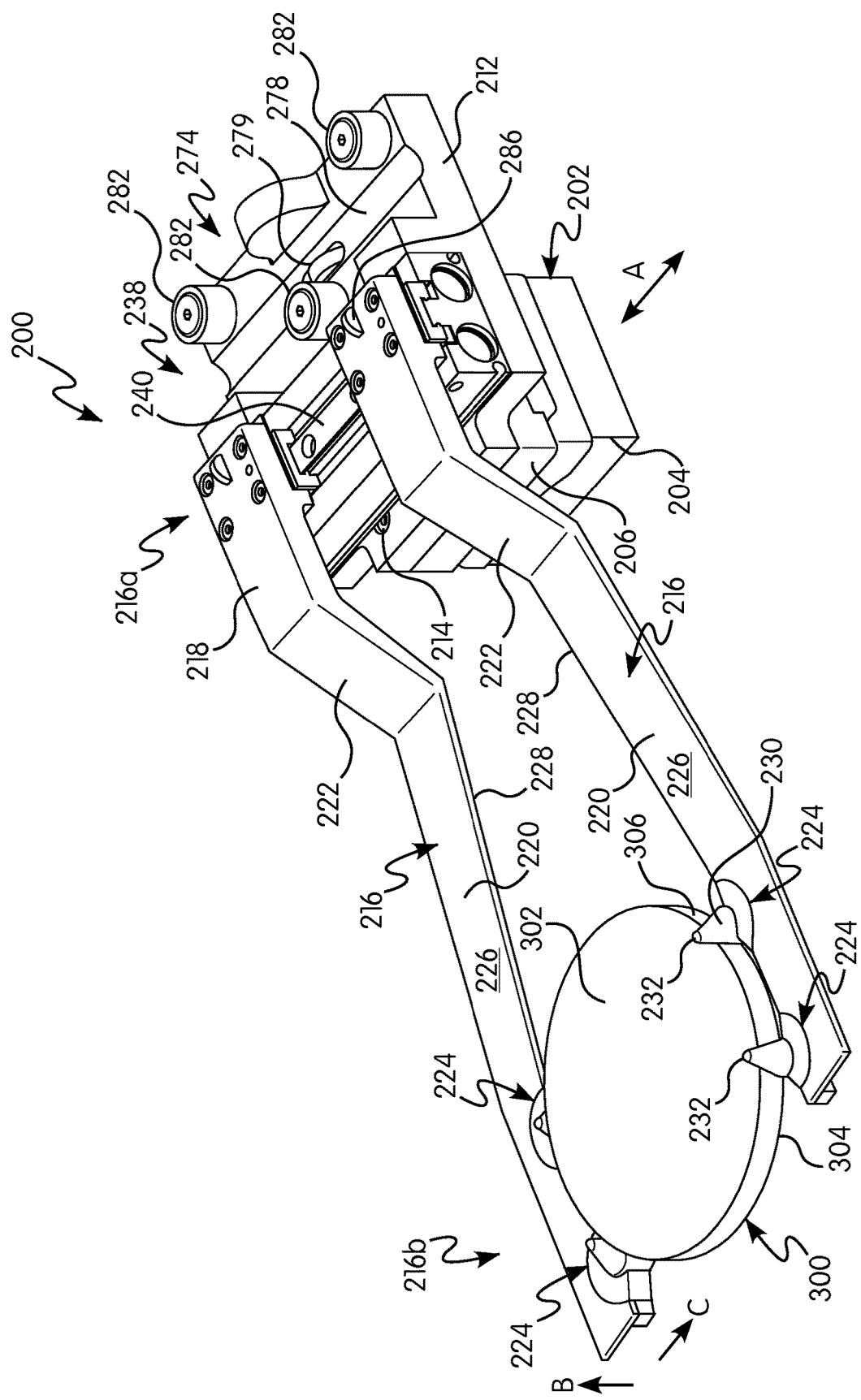
FIG. 3 is a representative perspective view of an optical article transport vehicle for use with an optical article production line according to some examples of the present invention.

With reference to FIG. 3, the transport vehicle 200 has a carrier base 202 configured for movement along the guideway 102, such as within the guide channel 106 and/or along the rails 108 (shown in FIG. 2). In some examples, at least a portion of the carrier base 202 has a magnetic flux source for magnetically interacting with the guideway 102. The magnetic flux source may be at least one permanent magnet in the first portion 204 or the second portion 206 to magnetically interact with the electromagnet in the guideway 102 and provide a vertical suspension force, a lateral guidance force, and a longitudinal propulsive force to the transport vehicle 200. In examples where the transport vehicle 200 adapted for movement along the guideway 102 is configured as a conveyor belt, the carrier base 202 may have an appropriate structure for mechanically interacting with the conveyor belt. For example, the carrier base 202 may have one or more wheels, bearings, or other mechanical structures for interacting with the conveyor belt.

With reference to FIG. 3, the transport vehicle 200 has a frame 212 connected to the carrier base 202. In some examples, the frame 212 is removably connected to the first portion 204 of the carrier base 202 by one or more fasteners 214. In other examples, the frame 212 is non-removably connected to the first portion 204 of the carrier base 202, such as by welding, adhesive, or other permanent connection means. The frame 212 may be monolithically formed with the first portion 204 and/or the second portion 206 of the carrier base 202. The frame 212 may be configured for supporting one or more mechanisms for carrying the optical article, as described herein.

With continued reference to FIG. 3, the transport vehicle 200 has a pair of gripping arms 216 configured for holding an optical article 300 during transport. Each gripping arm 216 has a first end 216a connected to the transport vehicle 200 and a second end 216b protruding from the transport vehicle 200. In some examples, each gripping arm 216 is connected at its first end 216a to the carrier base 202, such as the first portion 204 of the carrier base 202. In other examples, each gripping arm 216 is connected at its first end 216a to the frame 212. The gripping arms 216 are movable between a closed position and an open position. In the closed position, the gripping arms 216 are configured for holding the optical article 300 therebetween, while, in the open position, the optical article 300 is released from the gripping arms 216. The gripping arms 216 protrude relative to the carrier base 202 in a direction substantially perpendicular to a direction of travel of the carrier base 202 identified by arrow A in FIG. 3.

With reference to FIG. 3, each gripping arm 216 has a pair of projections 224 at the second end 216b. The projections 224 are spaced apart along a longitudinal length of the gripping arms 216 and are configured for contacting at least a portion of the optical article 300 when the gripping arms 216 are in the closed position. The projections 224 may protrude upwardly relative to an upper surface 226 of each gripping arm 216 in a direction of arrow B. In some examples, the projections 224 may also protrude inwardly from an inner lateral surface 228 of each gripping arm 216 in a direction of arrow C. The projections 224 may be removably or non-removably connected to the gripping arms 216. In some examples, each projection 224 is removably connected to the gripping arm 216 to allow replacement of the projections 224 without replacing the gripping arms 216. In other examples, each projection 224 is permanently and non-removably connected to the respective gripping arm 216 such that replacement of the projections 224 requires replacement of the gripping arms 216.

With continued reference to FIG. 3, the optical article 300 has a forward or top surface 302, a rearward or bottom surface 304, and a side surface 306 extending between the top surface 302 and the bottom surface 304. When the optical article 300 is an ophthalmic lens, the bottom surface 304 is opposed to the eye of an individual wearing the optical article 300, the side surface 306 typically resides within a supportive frame, and the top surface 302 faces incident light (not shown), at least a portion of which passes through the optical article 300 and into the individual's eye. With some examples, at least one of the top surface 302, the bottom surface 304, and the side surface 306 may have various shapes including, but not limited to, round, flat, cylindrical, spherical, planar, substantially planar, plano-concave and/or plano-convex, and curved, including, but not limited to, convex, and/or concave.

The optical article 300 can be selected from ophthalmic articles or elements, display articles or elements, visors, windows, mirrors, active liquid crystal cell articles or elements, and passive liquid crystal cell articles or elements. Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. Examples of display articles, elements and devices include, but are not limited to, screens, monitors, and security elements, including without limitation, security marks and authentication marks. Examples of windows include, but are not limited to, automotive and aircraft transparencies, filters, shutters, and optical switches. The optical article 300 can comprise a polymeric organic material chosen from thermosetting polymeric organic materials, thermoplastic polymeric organic materials, or a mixture of such polymeric organic materials.

With continued reference to FIG. 3, the transport vehicle 200 has a closure mechanism 238 for moving the gripping arms 216 between the closed position and the open position. In some examples, the closure mechanism 238 is a pneumatic mechanism, such as a gas compression spring. In other examples, the closure mechanism 238 is a mechanical mechanism, an electrical mechanism, an electromechanical mechanism, a hydraulic mechanism, or any combination thereof. The closure mechanism 238 may be configured for biasing the pair of gripping arms 216 to the closed position and moving the gripping arms 216 to the open position when the carrier base 202 is positioned at a predetermined portion of the guideway 102, such as at a docking station of a processing station 104, as described herein.

Figure 8:
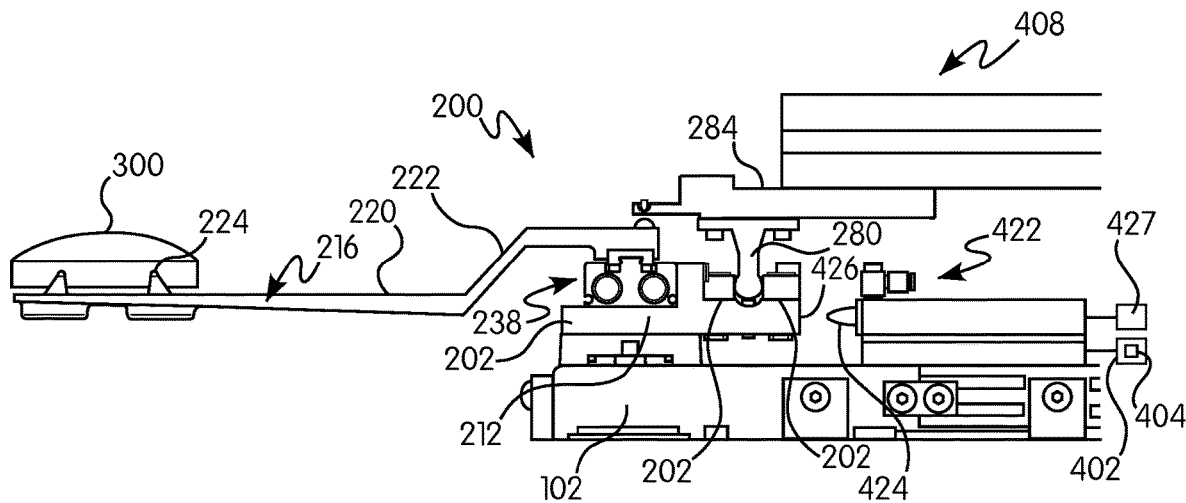
FIG. 8 is a representative side view of the pressure testing substation shown in FIG. 5 with a pressure testing module shown in a first position.
Figure 9:
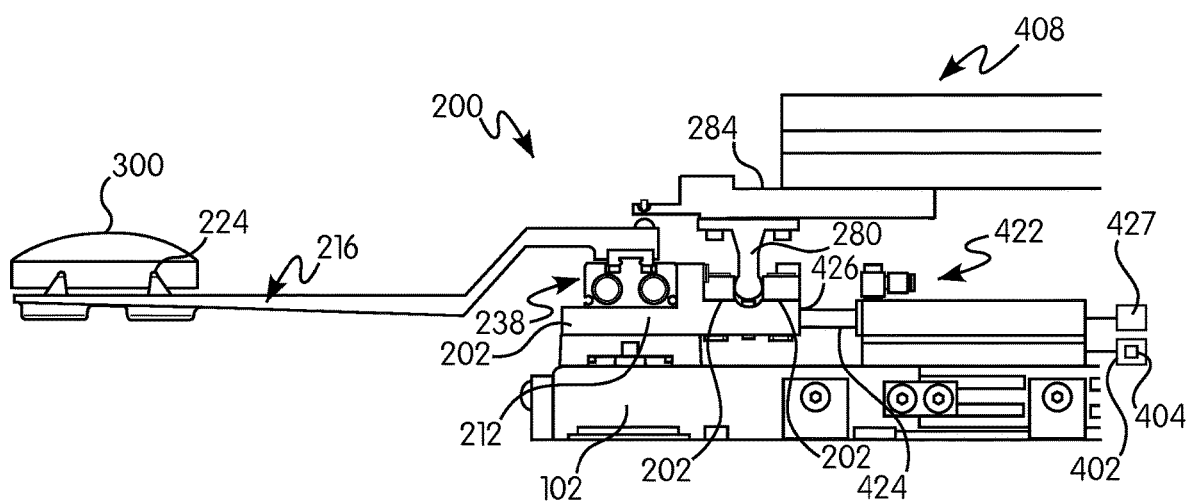
FIG. 9 is a representative side view of the pressure testing substation shown in FIG. 7 with the pressure testing module shown in a second position.

The closure mechanism 238 may be configured to move the gripping arms 216 to the open position when the carrier base 202 is positioned at a predetermined portion of the guideway 102, such as at a docking station 276 (shown in FIGS. 8-9). The docking station 276 may be associated with one or more processing stations 104 (shown in FIG. 1). The gripping arms 216 may be in the normally closed position when the transport vehicle 200 is at any portion of the guideway 102 other than the docking station 276. Once the transport vehicle 200 is stopped at a docking station 276, the closure mechanism 238 may be configured to move the gripping arms 216 to the open position due to interaction with at least a portion of the docking station 276.

With continued reference to FIG. 3, the transport vehicle 200 has an alignment mechanism 274 for aligning the transport vehicle 200 relative to a docking station 276 (shown in FIGS. 8-9) on the guideway 102. The alignment mechanism 274 is configured to precisely position the transport vehicle 200 on the guideway 102 relative to the docking station 276 by constraining the transport vehicle 200 to translate along the guideway 102 with a single degree of freedom.

The alignment mechanism 274 has a slot 278 formed in the frame 212 of the transport vehicle 200 and configured for receiving at least a portion of an alignment rail 280 of the docking station 276. As shown in FIG. 3, the slot 278 extends in a direction that is substantially parallel to a direction of travel of the transport vehicle 200. In some examples, one or more guide wheels 279 may be provided within the slot 278 for guiding the frame 212 along the alignment rail 280. With reference to FIGS. 8-9, the alignment rail 280 is also positioned substantially parallel to the guideway 102. In this manner, when the transport vehicle 200 is aligned with the alignment rail 280, the movement of the transport vehicle 200 is constrained to translation along the guideway 102 guided by the alignment rail 280. In some examples, the alignment rail 280 is secured to a frame 284 to constrain the alignment rail 280 relative to the guideway 102. In some examples, the alignment rail 280 extends along the entire guideway 102. In some examples, the alignment rail 280 extends along predetermined portions of the guideway 102, such as at the docking station 276 of at least one processing station 104.

With reference to FIG. 3, the alignment mechanism 274 further has at least one centering element 282 configured for engaging the alignment rail 280. In some examples, the at least one centering element 282 may be a pair of rotatable cam followers that straddle the alignment rail 280 on opposite lateral sides of the alignment rail 280, such as shown in FIG. 9. In other examples, three or more rotating cam followers may be provided. FIG. 3 shows three centering elements 282 arranged in a staggered orientation with one centering element 282 configured to engage a first lateral side of the alignment rail 280, and a pair of centering elements configured to engage a second lateral side of the alignment rail 280 (see FIG. 9).

With continued reference to FIG. 3, the transport vehicle 200 has at least one arm position indicator 286 configured for indicating a position of at least one of the gripping arms 216. In some examples, the at least one arm position indicator 286 may be associated with at least one of the gripping arms 216. In some examples, the at least one arm position indicator 286 is connected to one of the gripping arms 216. In other examples, each of the gripping arms 216 has at least one arm position indicator 286. The at least one arm position indicator 286 may be connected to at least a portion of the gripping arms 216, such as the first portion 218, the second portion 220, and/or the transition portion 222. In some examples, the at least one arm position indicator 286 protrudes upwardly from an upper surface 226 of the first portion 218 of at least one gripping arm 216.

The at least one arm position indicator 286 may be a permanent magnet that is configured for magnetically interacting with at least one position sensor 288 on the frame 284 and/or the alignment rail 280. In some examples, the at least one position sensor 288 may be a Hall effect sensor that varies its output signal based on a sensed magnetic field of the at least one arm position indicator 286. For example, the signal strength of the at least one position sensor 288 may be within a first range when the gripping arms 216 are in a first or open position, and the signal strength may increase or decrease to a second range when the gripping arms 216 are in a second or closed position. In some examples, a pair of position sensors 288 may be provided, wherein a first of the pair of position sensors 288 is configured to detect the open position of the gripping arms 216, while a second of the pair of sensors 288 is configured to detect the closed position of the gripping arms 216.

Referring back to FIG. 1, at least one of the processing stations 104 may be a pre-treatment station 104a, such as a plasma chamber. With some examples, the pre-treatment station 104a may be a pass-through processing station wherein at least a portion of the transport vehicle 200, along with the optical article carried thereon, moves through the pre-treatment station 104a. The plasma surface treatment conducted within the pre-treatment station 104a can be selected from one or more art-recognized plasma surface treatment methods including, but not limited to, corona treatment, atmospheric plasma treatment, atmospheric-pressure treatment, flame plasma treatment, and/or chemical plasma treatment. With some examples, the surface treatment conducted in the chamber is an oxygen plasma treatment.

The surface treatment process in the pre-treatment station 104a involves, with some examples, treating the surface of an optical substrate to promote wetting and enhance adhesion of a coating that is subsequently applied to and formed thereon. Plasma treatments, including corona treatments, provide a clean and efficient method of altering the surface properties of an optical substrate, such as roughening and/or chemically altering one or more surfaces thereof, without altering the bulk properties of the optical substrate.

With continued reference to FIG. 1, at least one of the processing stations 104 may be a washing/drying station 104b. With some examples, the washing/drying station 104b may be a pass-through processing station wherein at least a portion of the transport vehicle 200, along with the optical article carried thereon, moves through the washing/drying station 104b. The washing/drying station 104b may have high pressure spray nozzles which spray a cleaning agent, such as deionized water, to clean the surface of the optical article. In some examples, the washing parameters of the washing/drying station 104b, such as liquid pressure and washing time, can be programmable and can vary based on parameters, such as the type and/or size of the optical substrate, plasma treatment in the pre-treatment station 104a, and/or subsequent coating processes. Following washing, the optical article can, with some examples, be dried in the washing/drying station 104b by one or more drying methods including, but not limited to, high speed air nozzle(s), which can be filtered air nozzles. The drying parameters can be programmed in a manner similar to those associated with the washing parameters, with some examples.

With continued reference to FIG. 1, the production line 100 may have at least one coating station 104c configured to apply a coating material on at least one surface of the optical article. In some examples, the coating station 104c may have a spin coating apparatus, or any other coating apparatus configured for applying a coating on at least one surface of the optical article. For example, the coating station 104c may have an inkjet printing apparatus having one or more print heads configured to controllably discharge atomized droplets of coating material onto one or more coating surfaces of the optical article. The coating station 104c may have a controller (not shown) for controlling the operation of the coating apparatus. For example, the controller may be configured for controlling the printing operations of the one or more print heads.

With continued reference to FIG. 1, at least one of the processing stations 104 may be a curing station 104d for selectively and independently curing (such as at least partially curing) each coating applied to the optical article by the coating station 104c. The curing station 104d may be at least one of: (i) a thermal curing station; (ii) a UV curing station; (iii) an IR curing station; and (iv) combinations of at least two of (i), (ii), and (iii). The curing time within the curing station 104d can also vary depending on, for example, the particular coating. Each curing station 104d, with some examples, can include therein an atmosphere selected from an inert atmosphere (such as, but not limited to, argon and/or nitrogen) and/or a reactive atmosphere (such as, but not limited to, oxygen, CO, and/or $CO_2$).

With continued reference to FIG. 1, at least one of the processing stations 104 may be a loading/unloading station 104e. In some examples, empty transport vehicles 200 may be loaded with optical articles, while finished optical articles may be unloaded from the production line 100. In some examples, separate loading and unloading stations may be provided.

With continued reference to FIG. 1, at least one of the processing stations 104 may be a diagnostic station 104f configured for determining at least one characteristic of the transport vehicle 200 when the transport vehicle 200 is in an inspection position on the guideway 102. In some examples, a plurality of diagnostic stations 104f may be provided on the production line 100. One or more of the diagnostic stations 104f may be configured for determining at least one characteristic of the transport vehicle 200 while the transport vehicle 200 is "on-line", such as while the transport vehicle 200 is actively used for transporting optical articles in a production process. Alternatively, or in addition, one or more of the diagnostic stations 104f may be configured for determining at least one characteristic of the transport vehicle 200 while the transport vehicle 200 is "off-line", such as while the transport vehicle 200 is not used for actively transporting optical articles in a production process. At least one of a plurality of transport vehicles 200 on the guideway 102 may be configured to move to the diagnostic station 104f at a predetermined interval, such as after a predetermined length of time or after processing a predetermined number of optical articles, as described herein.

Figure 4:
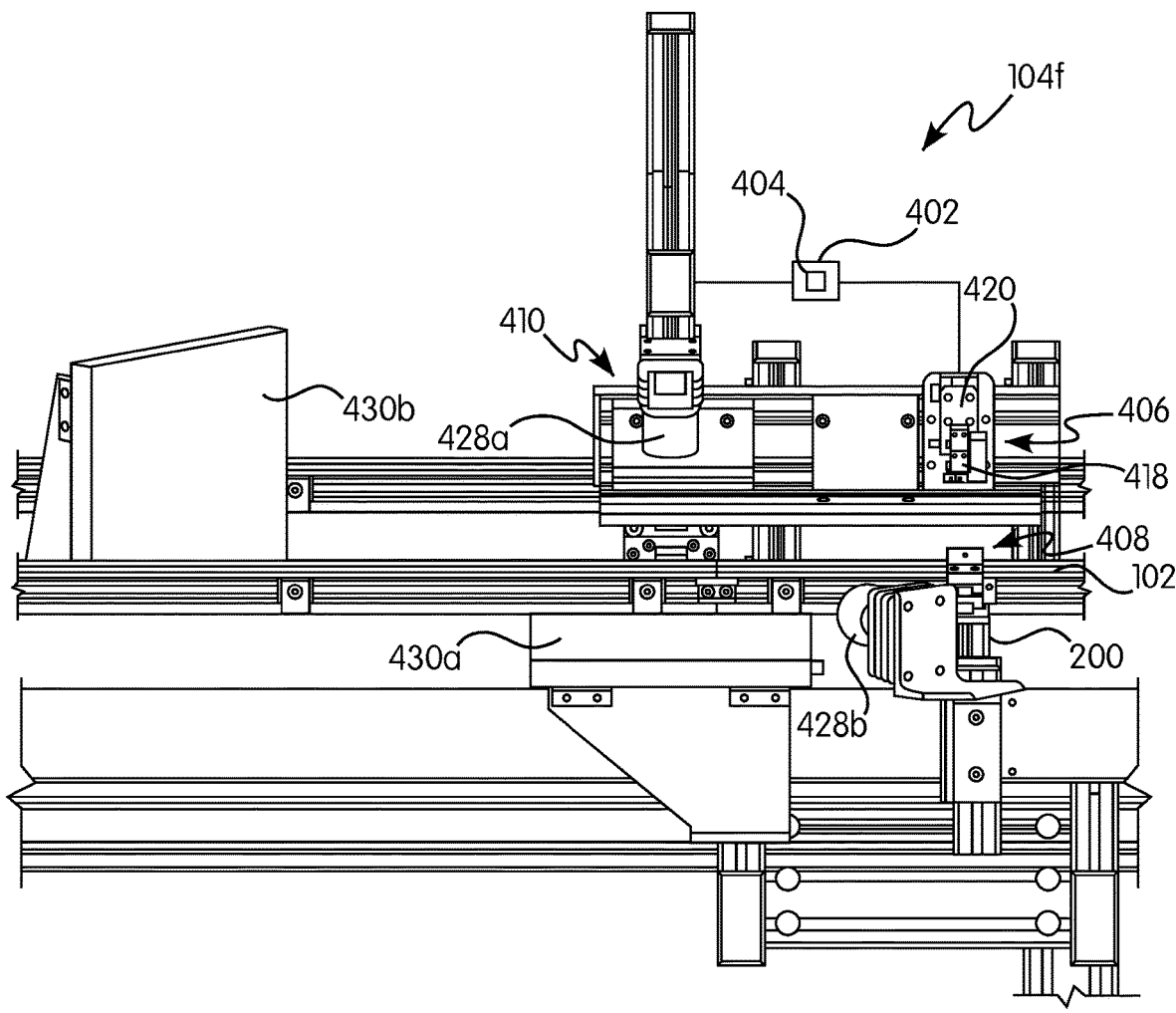
FIG. 4 is a representative perspective view of a diagnostic station in accordance with some examples of the present invention.

With reference to FIG. 4, the diagnostic station 104f has a diagnostic module 400 associated with the guideway 102 and configured to receive the transport vehicle 200 when the transport vehicle 200 is in an inspection position along the guideway 102. The inspection position may be a predetermined position on the guideway 102, such as a predetermined position of the guideway 102 at at least a portion of the diagnostic station 104f. In some examples, the inspection position may be a position at the diagnostic station 104f wherein the transport vehicle 200 is removed from the guideway 102. In some examples, at least one transport vehicle 200 may be sent to the diagnostic module 400 as part of a scheduled diagnostic test during operation of the production line 100 (shown in FIG. 1) to check the performance of the transport vehicle 200. In other examples, at least one transport vehicle 200 may be sent to the diagnostic module 400 as part of an unscheduled diagnostic test during operation of the production line 100 or during downtime of the production line 100. The diagnostic station 104f may have a plurality of diagnostic modules 400, with each module 400 having one or more substations for testing at least one diagnostic action on the transport vehicle 200.

With continued reference to FIG. 4, the exemplary diagnostic module 400 has a controller 402 having at least one processor 404 for controlling operation of the diagnostic module 400. The at least one processor 404 may be programmed or configured for performing at least one diagnostic action on the transport vehicle 200 via the diagnostic module 400 when the transport vehicle 200 is in the inspection position, as discussed herein.

With continued reference to FIG. 4, the exemplary diagnostic module 400 has a grip testing substation 406 configured for measuring a force exerted by the pair of gripping arms 216 of the transport vehicle 200 when the gripping arms 216 are in the closed position. The exemplary diagnostic module 400 further has a pressure testing substation 408 in communication with a source of pressurized air and configured for pressurizing and depressurizing the pneumatic closure mechanism 238 of the transport vehicle 200. The exemplary diagnostic module 400 further has an optical inspection substation 410 configured for capturing image data of the transport vehicle 200. The number and arrangement of substations shown in FIG. 4 are provided as an example. In some non-limiting embodiments, the diagnostic module 400 includes additional substations, fewer substations, different substations, or differently arranged substations than those shown in FIG. 4. Additionally, or alternatively, a set of substations (e.g., one or more substations) of the diagnostic module 400 can perform one or more functions described as being performed by another set of substations of the diagnostic module 400.

In some examples, an operation of one of the plurality of substations of the diagnostic module 400 is associated with operation of another of the plurality of substations in a sequential manner. For example, an operation is performed sequentially (e.g., before or after, immediately before or after, etc.) another operation in a process for testing the transport vehicle 200 using the diagnostic module 400. For example, the grip force testing at the grip testing substation 406 may be scheduled to occur immediately before or after the pressure testing at the pressure testing substation 408 or the optical inspection at the optical inspection substation 410.

In other examples, an operation of one of the plurality of substations of the diagnostic module 400 is associated with operation of another of the plurality of substations in a parallel or simultaneous manner. For example, an operation is performed simultaneously as (e.g., in parallel with, at the same time as, etc.) another operation in a process for testing the transport vehicle 200 using the diagnostic module 400. For example, the grip force testing at the grip testing substation 406 may be scheduled to occur at the same time as the pressure testing at the pressure testing substation 408 and/or the optical inspection at the optical inspection substation 410.

In some non-limiting embodiments, simultaneously performed or parallel operations are independent from one another. For example, a first operation, such as the grip force testing at the grip testing substation 406, may not modify a second operation that occurs simultaneously with the first operation, such as pressure testing at the pressure testing substation 408 and/or optical inspection at the optical inspection substation 410.

In some examples, a plurality of diagnostic stations 104f may be provided on the production line 100. At least one of the plurality of diagnostic stations 104f may be an "on-line" diagnostic station 104f for testing a first set of characteristics of the transport vehicle 200 while the transport vehicle 200 is actively used in an operational production line 200. At least one of the plurality of diagnostic stations 104f may be an "off-line" diagnostic station for testing a second set of characteristics of the transport vehicle 200 while the transport vehicle 200 is taken off active use on an active production line 100, or while the production line 100 is inactive. The first set of characteristics tested in an "on-line" diagnostic station 104f may be different or partially overlap with the second set of characteristics tested in an "off-line" diagnostic station 104f.

Figure 5:
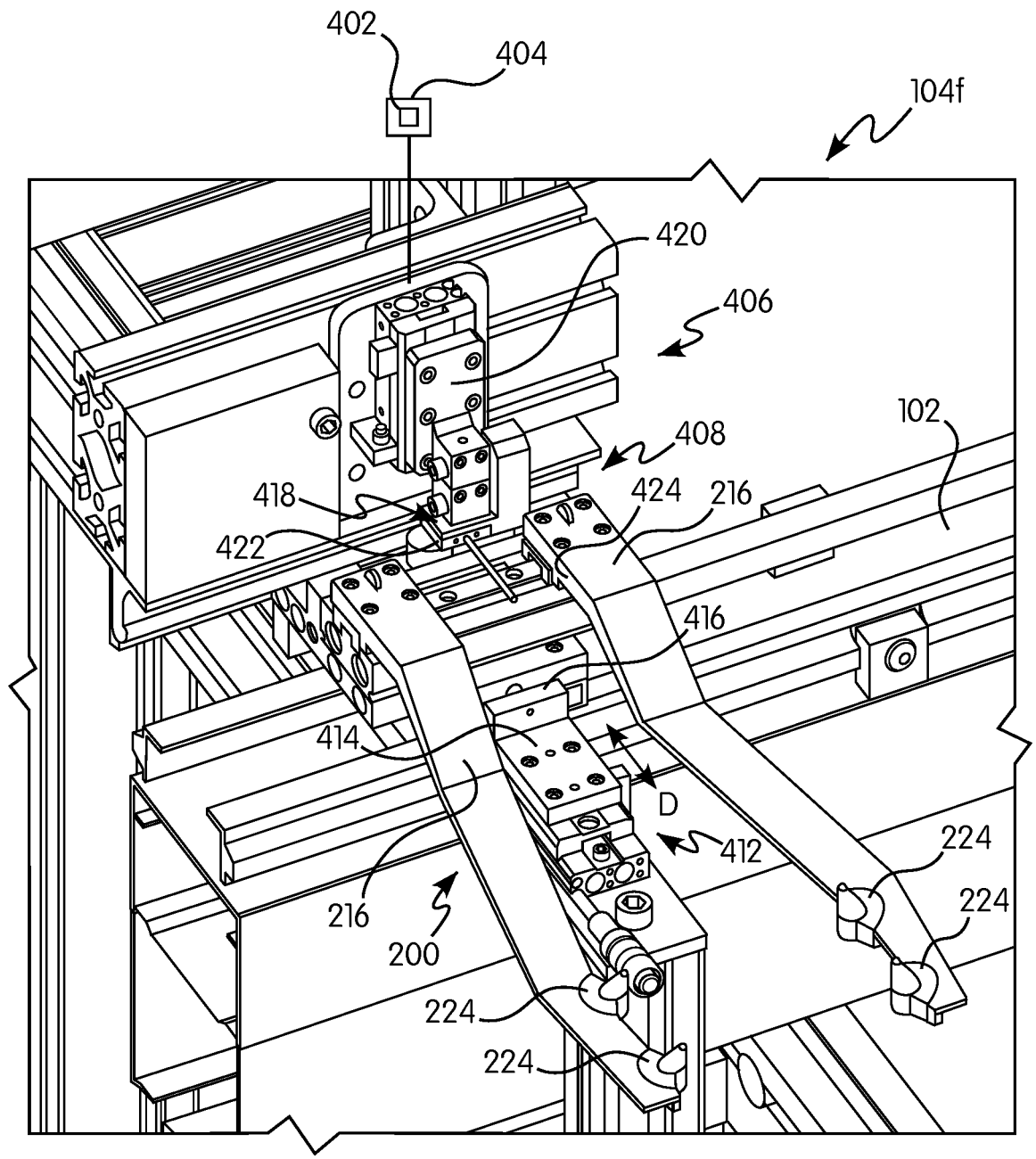
FIG. 5 is a representative perspective view of a grip testing substation and a pressure testing substation of the diagnostic station shown in FIG. 4.

With reference to FIG. 5, the diagnostic station 104f has a clamping mechanism 412 for retaining the transport vehicle 200 in a fixed position (i.e., the inspection position) relative to the guideway 102 and/or at least one of the substations of the diagnostic module 400, such as the grip testing substation 406 and/or the pressure testing substation 408. The clamping mechanism 412 is movable between a first position, wherein the transport vehicle 200 is freely movable along the guideway 102 and relative to at least one of the substations of the diagnostic module 400, and a second position, wherein the position of the transport vehicle 200 is immobilized relative to the guideway 102 and at least one of the substations of the diagnostic module 400. In some examples, when the clamping mechanism 412 is in the first position, the clamping mechanism 412 may be out of direct physical contact with the transport vehicle 200. When the clamping mechanism 412 is in the second position, the clamping mechanism 412 may be in direct physical contact with the transport vehicle 200.

With continued reference to FIG. 5, the clamping mechanism 412 has a clamp 414 positioned on a lateral side of the guideway 102 and configured to move between the first position and the second position in a direction of arrow D. The clamp 414 has a clamping face 416 configured to contact at least a portion of the transport vehicle 200 when the transport vehicle 200 is in the inspection position on the guideway 102 and the clamp 414 is extended to the second position. In some examples, the clamping face 416 may be shaped to correspond to the shape of at least a portion of the transport vehicle 200 that is engaged by the clamping face 416. For example, one or more features on the clamping face 416 may be provided to correspond to the features on the transport vehicle 200 such that the one or more features on the clamping face 416 register with the one or more features on the transport vehicle 200 to precisely position the transport vehicle 200 relative to the clamp 414.

When the clamping face 416 is engaged with the transport vehicle 200, movement of the transport vehicle 200 along the guideway 102 is prevented to allow one or more diagnostic actions to be performed by at least one of the substations of the diagnostic module 400. The clamping mechanism 412 may be operatively connected with the controller 402 to indicate to the controller whether the transport vehicle 200 is secured in the inspection position. One or more sensors 415, limit switches, or other mechanisms may be provided on the clamping mechanism 412 to indicate the position of the clamp 414 between the first position and the second position.

With continued reference to FIG. 5, the grip testing substation 406 has at least one force sensor 418 in operative communication with the at least one processor 404. The at least one force sensor 418 is configured for measuring the closing force of the gripping arms 216 when the gripping arms 216 are in the closed position. In some examples, the at least one force sensor 418 may be a load cell.

Figure 6:
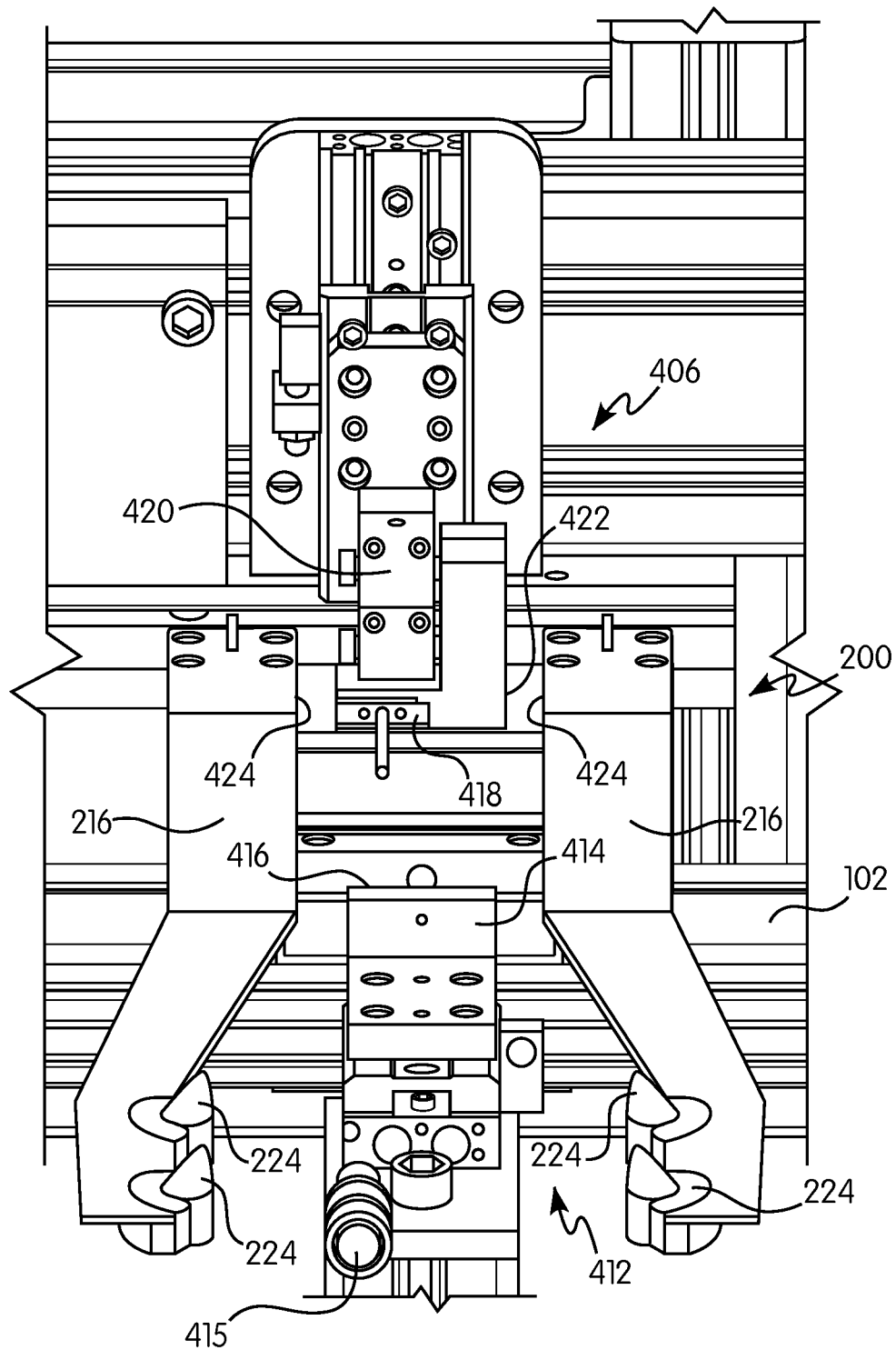
FIG. 6 is a representative perspective view of the grip testing substation shown in FIG. 5 with a pair of gripping arms of an optical transport vehicle shown in an open position.
Figure 7:
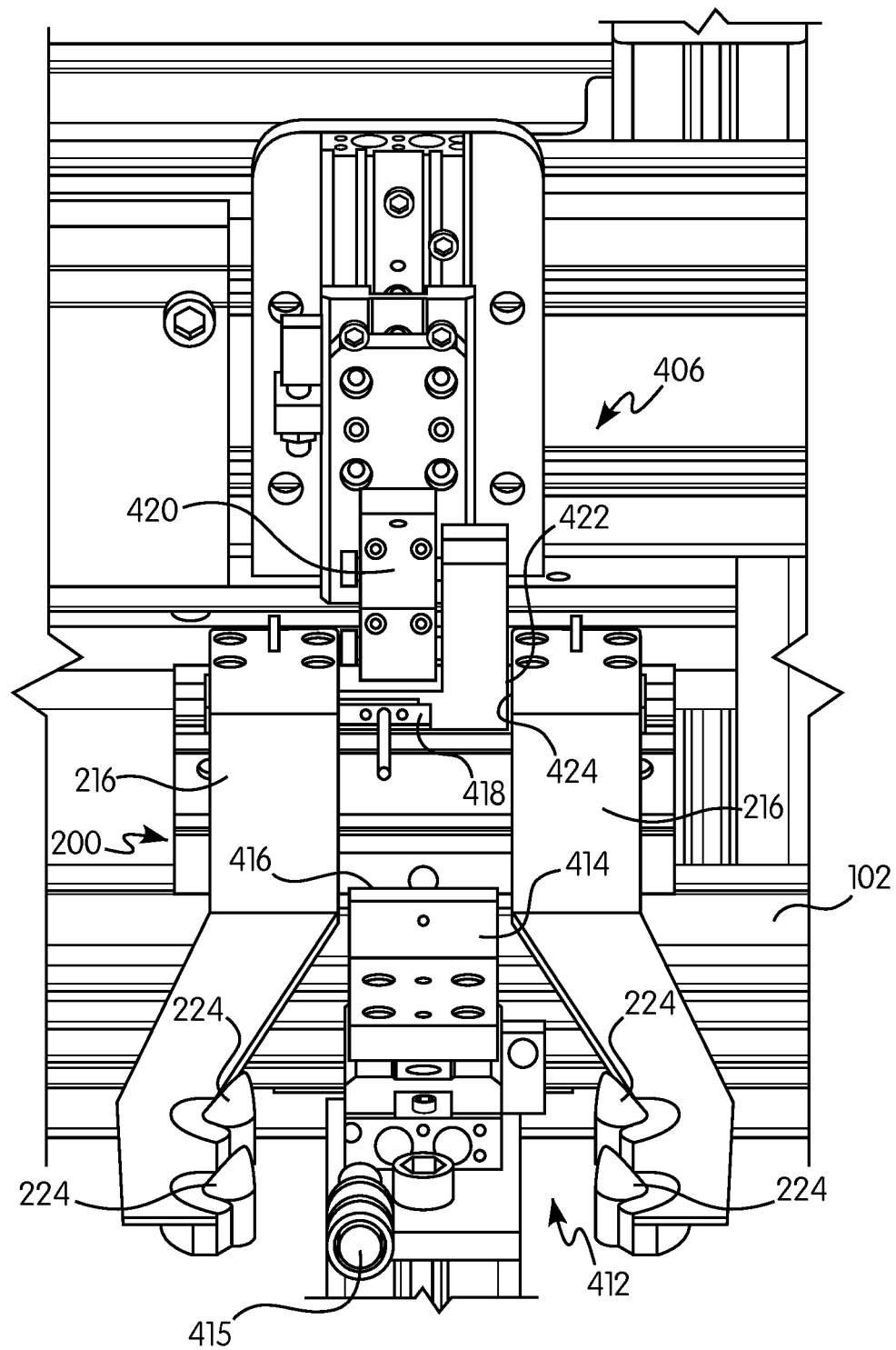
FIG. 7 is a representative perspective view of the grip testing substation shown in FIG. 5 with a pair of gripping arms of an optical transport vehicle shown in a closed position.

With continued reference to FIG. 5, the at least one force sensor 418 may be mounted on a movable arm 420. The arm 420 may be movable between a first position (FIG. 5), where the at least one force sensor 418 is positioned out of direct physical contact with the pair of gripping arms 216 and a second position (FIGS. 6-7), where the at least one force sensor 418 is positioned such that it is in direct physical contact with the pair of gripping arms 216 when the gripping arms 216 are in the closed position. The arm 420 is moved to the second position when the transport vehicle 200 is secured in the inspection position by the clamping mechanism 412. When the arm 420 is moved to the second position, the at least one force sensor 418 may be positioned such that load sensing surfaces 422 are aligned with inner surfaces 424 of the gripping arms 216. When the gripping arms 216 are moved from the open position (FIG. 6) to the closed position (FIG. 7), the inner surfaces 424 contact the load sensing surfaces 422 of the at least one force sensor 418.

Based on a force of the gripping arms 216 detected by the at least one force sensor 418, the at least one processor 404 is programmed or configured for determining whether the force exerted by the gripping arms 216 in the closed position is within a predetermined range and/or outside the predetermined range. In some examples, the predetermined range may be 3 lbf (13.3 N) to 25 lbf (111.2 N). A change in the force applied by the gripping arms 216 in the closed position may indicate that the pneumatic closure mechanism 238 has a leak. If the force magnitude is higher or lower than this predetermined range, the at least one processor 404 is programmed or configured for generating at least one notification about a status of the transport vehicle 200. For example, the at least one processor 404 may be programmed or configured to generate a notification that the closing force exerted by the gripping arms 216 is outside the predetermined range. The notification may further indicate that the transport vehicle 200 should be serviced. In some examples, the at least one processor 404 may send the notification to a remote display terminal.

With reference to FIGS. 8-9, the pressure testing substation 408 may be configured for testing the operation of the pneumatic closure mechanism 238 of the gripping arms 216, such as by selectively pressurizing and depressurizing the pneumatic closure mechanism 238 of the transport vehicle 200. For example, the pressure testing substation 408 may be configured for pressurizing the pneumatic closure mechanism 238 of the transport vehicle 200 to move the pair of gripping arms 216 from the closed position to the open position.

The pressure testing substation 408 may be in operative communication with the at least one processor 404. In some examples, the at least one processor 404 is programmed or configured for measuring whether a length of time during movement of the gripping arms 216 between the closed position and the open position is within a predetermined range and/or outside the predetermined range. In some examples, the predetermined range may be 0.05 s to 0.25 s. Changes in the length of time during movement of the gripping arms 216 from the closed position to the open position may indicate that the pneumatic closure mechanism 238 is contaminated with particles and/or that excessive wear has occurred on one or more seals of the pneumatic closure mechanism 238. If the length of time during movement of the gripping arms 216 from the closed position to the open position is longer than this predetermined range, the at least one processor 404 is programmed or configured for generating at least one notification that the length of time for opening the gripping arms 216 is outside the predetermined range. The notification may further indicate that the transport vehicle 200 should be serviced. In some examples, the at least one processor 404 may send the notification to a remote display terminal.

With continued reference to FIGS. 8-9, the pressure testing substation 408 has a docking station 422 with at least one pin 424 configured for interacting with a check valve 426 of the pneumatic closure mechanism 238 of the gripping arms 216. In some examples, the at least one pin 424 may be movable between a first position (FIG. 8), wherein the at least one pin 424 is not in direct physical contact with the check valve 426 and a second position (FIG. 9), wherein the at least one pin 424 is in direct physical contact with the check valve 426. The docking station 422 is in fluid communication with a pressurized air source 427 such that pressurized air is delivered to the pneumatic closure mechanism 238 of the gripping arms 216 when the at least one pin 424 interacts with the check valve 426. For example, the at least one pin 424 may open the check valve 426 by pushing the check valve 426 from a first or closed position to a second or open position. The at least one pin 424 may seal the second check valve 426 after opening the second check valve 426 to prevent the escape of pressurized air therefrom. Air pressure may be applied at a varying rate to realign internal seals of the pneumatic closure mechanism 238 and bleed residual pressure from the pneumatic closure mechanism 238. Furthermore, the volume of air introduced through the check valve 426 removes any debris that may contaminate the check valve 426 during use of the transport vehicle 200 on the production line.

Figure 10:
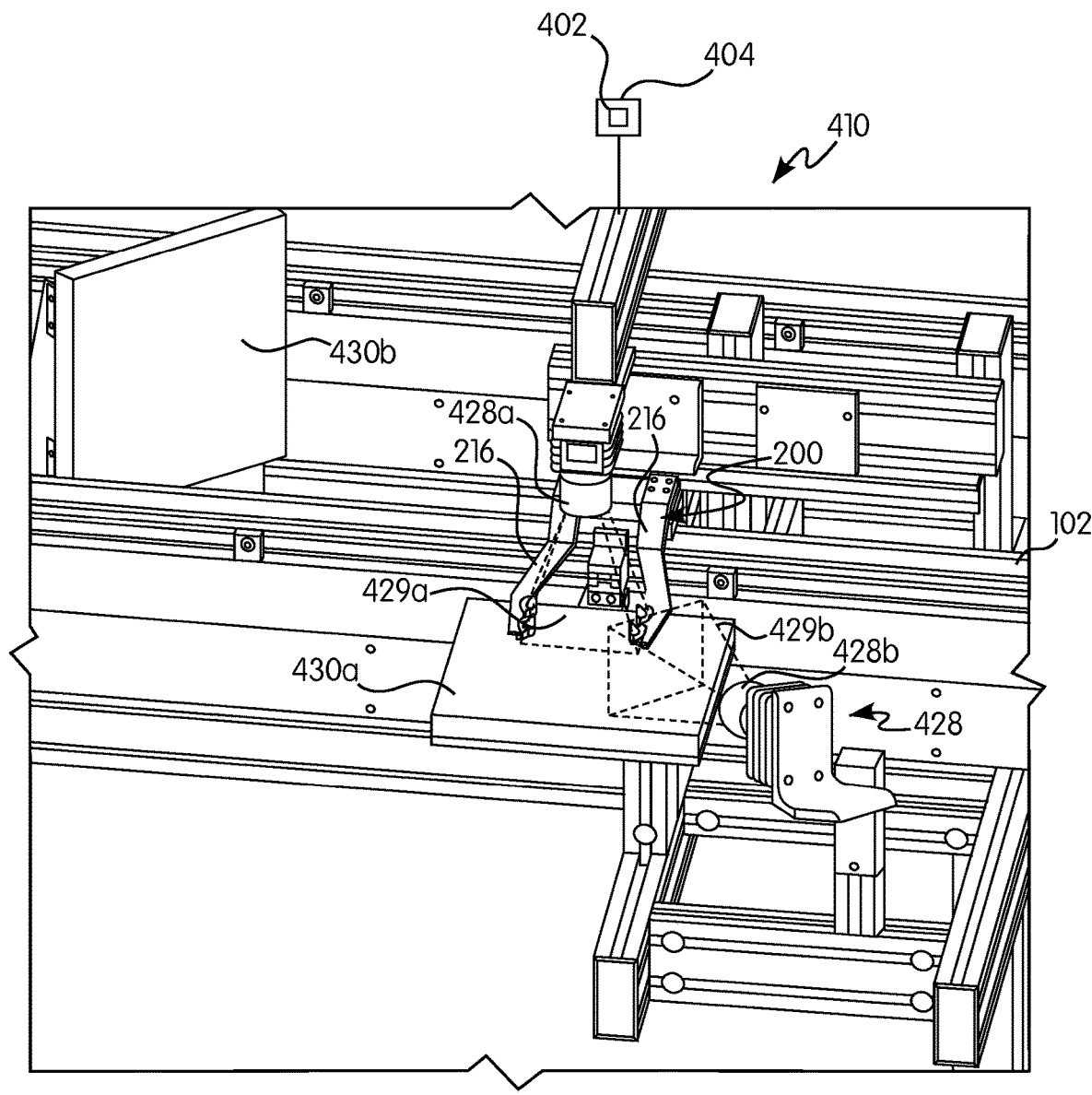
FIG. 10 is a representative perspective view of an optical inspection substation shown in FIG. 4.

With reference to FIG. 10, the optical inspection substation 410 has at least one camera 428 configured for capturing image data of the transport vehicle 200. In some examples, the at least one camera 428 may be a first camera 428a configured for capturing image data of a top portion of the transport vehicle 200 when the transport vehicle 200 is within a field of view 429a of the first camera 428a and a second camera 428b configured for capturing image data of a side portion of the transport vehicle 200 when the transport vehicle 200 is within a field of view 429b of the second camera 428b. The second camera 428b may be positioned at an angle of 40° to 50° relative to a longitudinal axis of the transport vehicle 200 extending in a direction of the pair of gripping arms 216. A first background screen 430a may be provided opposite the first camera 428a such that at least a portion of the transport vehicle 200 is disposed between the first camera 428a and the first background screen 430a. Similarly, a second background screen 430b may be provided opposite the second camera 428b such that at least a portion of the transport vehicle 200 is disposed between the second camera 428b and the second background screen 430b. The first and second background screens 430a, 430b provide a contrasting background surface against which at least a portion of the transport vehicle 200 can be imaged with the first and second cameras 428a, 428b.

With continued reference to FIG. 10, the optical inspection substation 410 is in operative communication with the at least one processor 404. The at least one processor 404 may be programmed or configured for determining whether the image data taken by the first and second cameras 428a, 428b has at least one predetermined characteristic of the transport vehicle 200. In some examples, the at least one predetermined characteristic of the transport vehicle 200 may be a presence or an absence of at least one physical feature of the transport vehicle 200, such as the shape of the gripping arms 216 and/or the absence/presence of the projections 224 on the gripping arms 216. In other examples, the at least one predetermined characteristic of the transport vehicle 200 may be a three-dimensional position of at least one physical feature of the transport vehicle 200 relative to a reference point on the diagnostic module 400. For example, at least one processor 404 may be programmed or configured for determining a vertical displacement of the gripping arms 216 relative to a reference point in a vertical plane and/or a horizontal displacement of the gripping arms 216 relative to a reference point in a horizontal plane. In further examples, the at least one predetermined characteristic of the transport vehicle 200 may be a color of at least one of the pair of gripping arms 216. Changes in color of the gripping arms 200 during use of the transport vehicle 200 in a production process may indicate a problem in one or more of the processing stations.

In response to determining that the image data taken by the at least one camera 428 has the at least one predetermined characteristic, the at least one processor 404 may be programmed or configured for generating at least one notification about a status of the transport vehicle 200. For example, the notification may indicate that the gripping arms 216 must be realigned or replaced, and/or that the projections 224 need replacement. The notification may further indicate that the transport vehicle 200 should be serviced. In some examples, the at least one processor 404 may send the notification to a remote display terminal.

In some examples, the at least one processor 404 may be programmed or configured for monitoring the operating state of transport vehicles 200 using a statistics algorithm, such as a statistical process control (SPC) method. Measurement values taken during each inspection of transport vehicles 200 may be recorded and used as reference values for future inspections. In this manner, individual parameters may be tracked over time to gain information about how transport vehicles 200 wear. The SPC method thus allows for an early detection of potential problem areas and allows transport vehicles 200 to be serviced before problems occur. This eliminates production issues and unscheduled production downtime.

In further examples, the diagnostic station 104f can be characterized by one or more of the following clauses:

Clause 1: A diagnostic station for inspecting an article transport vehicle movable along a guideway, the diagnostic station comprising: a diagnostic module associated with the guideway and configured to receive the article transport vehicle when the article transport vehicle is in an inspection position along the guideway, the diagnostic module comprising at least one of the following: a grip testing substation having at least one force sensor configured for measuring a force exerted by a closure mechanism of the article transport vehicle in a closed position; a pressure testing substation in communication with a source of pressurized air and configured for pressurizing and depressurizing the closure mechanism; and an optical inspection substation having at least one camera configured for capturing image data of the article transport vehicle.

Clause 2: The diagnostic station of clause 1, further comprising a controller having at least one processor, wherein the at least one processor is programmed or configured for determining whether the image data has at least one predetermined characteristic of the article transport vehicle.

Clause 3: The diagnostic station of clause 2, wherein, in response to determining that the image data has the at least one predetermined characteristic, the at least one processor is programmed or configured for generating at least one notification about a status of the article transport vehicle.

Clause 4: The diagnostic station of clause 2 or 3, wherein the at least one predetermined characteristic of the article transport vehicle is a presence or an absence of at least one physical feature of the article transport vehicle.

Clause 5: The diagnostic station of any of clauses 2-4, wherein the at least one predetermined characteristic of the article transport vehicle is a three-dimensional position of at least one physical feature of the article transport vehicle relative to the diagnostic module.

Clause 6: The diagnostic station of any of clauses 2-5, wherein the at least one predetermined characteristic of the article transport vehicle is a color of at least one of a pair of gripping arms of the closure mechanism.

Clause 7: The diagnostic station of any of clauses 1 to 6, wherein the at least one camera comprises a first camera configured for capturing image data of a top portion of the article transport vehicle and a second camera configured for capturing image data of a side portion of the article transport vehicle.

Clause 8: The diagnostic station of clause 7, wherein the second camera is positioned at an angle of 40° to 50° relative to a longitudinal axis of the article transport vehicle extending in a direction of a pair of gripping arms of the closure mechanism.

Clause 9: The diagnostic station of any of clauses 1 to 8, wherein the at least one force sensor is movable between a first position out of direct physical contact with a pair of gripping arms of the closure mechanism and a second position in direct physical contact with the pair of gripping arms when the gripping arms are in the closed position.

Clause 10: The diagnostic station of any of clauses 1 to 9, further comprising a controller having at least one processor, wherein the at least one processor is programmed or configured for determining whether the force exerted by a pair of gripping arms of the closure mechanism in the closed position is outside a predetermined range, and wherein, in response to determining that the force is outside the predetermined range, generating at least one notification about a status of the article transport vehicle.

Clause 11: The diagnostic station of any of clauses 1 to 10, wherein the pressure testing substation is configured for actuating a check valve of the closure mechanism.

Clause 12: The diagnostic station of any of clauses 1 to 11, wherein the pressure testing substation is configured for pressurizing the closure mechanism of the article transport vehicle to move a pair of gripping arms from the closed position to an open position, and wherein a controller having at least one processor is programmed or configured for measuring whether a length of time during movement of the gripping arms between the closed position and the open position is outside a predetermined range.

Clause 13: The diagnostic station of clause 12, wherein, in response to determining that the length of time is outside the predetermined range, the at least one processor is programmed or configured for generating at least one notification about a status of the article transport vehicle.

Clause 14: The diagnostic station of any of clauses 1 to 13, wherein at least one of the grip testing substation and the pressure testing substation comprises a clamping mechanism for retaining the article transport vehicle in the inspection position.

Clause 15: The diagnostic station of clause 14, wherein the clamping mechanism is movable between a first position out of direct physical contact with the article transport vehicle and a second position in direct physical contact with the article transport vehicle.

Clause 16: A diagnostic station for inspecting an article transport vehicle movable along a guideway, the article transport vehicle having a pair of gripping arms movable via a pneumatic closure mechanism between a closed position for holding an article and an open position for releasing the article, the diagnostic station comprising: a diagnostic module associated with the guideway and configured to receive the article transport vehicle when the article transport vehicle is in an inspection position along the guideway; and a controller having at least one processor, wherein the at least one processor is programmed or configured for performing at least one diagnostic action on the article transport vehicle via the diagnostic module, wherein the diagnostic module has at least one of the following: a grip testing substation having at least one force sensor configured for measuring a force exerted by the pair of gripping arms of the article transport vehicle in the closed position; a pressure testing substation in communication with a source of pressurized air and configured for pressurizing and depressurizing the pneumatic closure mechanism of the article transport vehicle; and an optical inspection substation having at least one camera configured for capturing image data of the article transport vehicle.

Clause 17: The diagnostic station of clause 16, wherein the at least one processor is programmed or configured for determining whether the image data has at least one predetermined characteristic of the article transport vehicle.

Clause 18: The diagnostic station of clause 17, wherein, in response to determining that the image data has the at least one predetermined characteristic, the at least one processor is programmed or configured for generating at least one notification about a status of the article transport vehicle.

Clause 19: The diagnostic station of clause 17 or 18, wherein the at least one predetermined characteristic of the article transport vehicle is a presence or an absence of at least one physical feature of the article transport vehicle.

Clause 20: The diagnostic station of any of clauses 17-19, wherein the at least one predetermined characteristic of the article transport vehicle is a three-dimensional position of at least one physical feature of the article transport vehicle relative to the diagnostic module.

Clause 21: The diagnostic station of any of clauses 17-20, wherein the at least one predetermined characteristic of the article transport vehicle is a color of at least one of the pair of gripping arms of the article transport vehicle.

Clause 22: The diagnostic station of any of clauses 16 to 21, wherein the at least one camera comprises a first camera configured for capturing image data of a top portion of the article transport vehicle and a second camera configured for capturing image data of a side portion of the article transport vehicle.

Clause 23: The diagnostic station of clause 22, wherein the second camera is positioned at an angle of 40° to 50° relative to a longitudinal axis of the article transport vehicle extending in a direction of the pair of gripping arms.

Clause 24: The diagnostic station of any of clauses 16 to 23, wherein the at least one force sensor is movable between a first position out of direct physical contact with the pair of gripping arms of the article transport vehicle to a second position in direct physical contact with the pair of gripping arms of the article transport vehicle when the gripping arms are in the closed position.

Clause 25: The diagnostic station of any of clauses 16 to 24, wherein the at least one processor is programmed or configured for determining whether the force exerted by the pair of gripping arms of the article transport vehicle in the closed position is outside a predetermined range, and wherein, in response to determining that the force is outside the predetermined range, generating at least one notification about a status of the article transport vehicle.

Clause 26: The diagnostic station of any of clauses 16 to 25, wherein the pressure testing substation is configured for actuating a check valve of the pneumatic closure mechanism.

Clause 27: The diagnostic station of any of clauses 16 to 26, wherein the pressure testing substation is configured for pressurizing the pneumatic closure mechanism of the article transport vehicle to move the pair of gripping arms from the closed position to the open position, and wherein the at least one processor is programmed or configured for measuring whether a length of time during movement of the gripping arms between the closed position and the open position is outside a predetermined range.

Clause 28: The diagnostic station of clause 27, wherein, in response to determining that the length of time is outside the predetermined range, the at least one processor is programmed or configured for generating at least one notification about a status of the article transport vehicle.

Clause 29: The diagnostic station of any of clauses 16-28, wherein at least one of the grip testing substation and the pressure testing substation comprises a clamping mechanism for retaining the article transport vehicle in the inspection position.

Clause 30: The diagnostic station of clause 29, wherein the clamping mechanism is movable between a first position out of direct physical contact with the article transport vehicle and a second position in direct physical contact with the article transport vehicle.

Clause 31: A method of inspecting an article transport vehicle movable along a guideway, the method comprising: receiving the article transport vehicle in a diagnostic module associated with the guideway when the article transport vehicle is in an inspection position, and testing at least one property of the article transport vehicle using the diagnostic module, wherein the testing comprises at least one of: measuring a force exerted by a closure mechanism of the article transport vehicle in a closed position using at least one force sensor; pressurizing and depressurizing the closure mechanism using a pressure testing substation in communication with a source of pressurized air; and capturing image data of the article transport vehicle using an optical inspection substation having at least one camera.

Clause 32: The method of clause 31, further comprising determining, using a controller having at least one processor, whether the image data has at least one predetermined characteristic of the article transport vehicle.

Clause 33: The method of clause 32, further comprising generating at least one notification about a status of the article transport vehicle in response to determining that the image data has the at least one predetermined characteristic.

Clause 34: The method of clause 32 or 33, wherein the at least one predetermined characteristic of the article transport vehicle is a presence or an absence of at least one physical feature of the article transport vehicle.

Clause 35: The method of any of clauses 32-34, wherein the at least one predetermined characteristic of the article transport vehicle is a three-dimensional position of at least one physical feature of the article transport vehicle relative to the diagnostic module.

Clause 36: The method of any of clauses 32-35, wherein the at least one predetermined characteristic of the article transport vehicle is a color of at least one of a pair of gripping arms of the closure mechanism.

Clause 37: The method of any of clauses 31 to 36, wherein the at least one camera comprises a first camera configured for capturing image data of a top portion of the article transport vehicle and a second camera configured for capturing image data of a side portion of the article transport vehicle.

Clause 38: The method of clause 37, wherein the second camera is positioned at an angle of 40° to 50° relative to a longitudinal axis of the article transport vehicle extending in a direction of a pair of gripping arms of the closure mechanism.

Clause 39: The method of any of clauses 31 to 38, further comprising moving the at least one force sensor between a first position out of direct physical contact with a pair of gripping arms of the closure mechanism and a second position in direct physical contact with the pair of gripping arms when the gripping arms are in the closed position.

Clause 40: The method of any of clauses 31 to 39, further comprising determining, using a controller having at least one processor, whether the force exerted by a pair of gripping arms of the closure mechanism in the closed position is outside a predetermined range, and, in response to determining that the force is outside the predetermined range, generating at least one notification about a status of the article transport vehicle.

Clause 41: The method of any of clauses 31 to 40, further comprising actuating a check valve of the closure mechanism using the pressure testing substation.

Clause 42: The method of any of clauses 31 to 41, further comprising pressurizing the closure mechanism of the article transport vehicle using the pressure testing substation to move a pair of gripping arms from the closed position to an open position, and measuring, using a controller having at least one processor, whether a length of time during movement of the gripping arms between the closed position and the open position is outside a predetermined range.

Clause 43: The method of clause 42, further comprising generating at least one notification about a status of the article transport vehicle in response to determining that the length of time is outside the predetermined range.

Clause 44: The method of any of clauses 31 to 43, further comprising retaining the article transport vehicle in the inspection position using a clamping mechanism.

Clause 45: The method of clause 44, wherein the clamping mechanism is movable between a first position out of direct physical contact with the article transport vehicle and a second position in direct physical contact with the article transport vehicle.

The present invention has been described with reference to specific details of particular examples thereof. It is not intended that such details be regarded as limitations upon the scope of the invention except insofar as and to the extent that they are included in the accompanying claims.

What is claimed is:

1. A diagnostic station for a production line for inspecting an optical article transport vehicle movable along a guideway, the optical transport vehicle comprising a pair of gripping arms and a closure mechanism for moving the pair of gripping arms between a closed position configured for holding an optical article and an open position configured for releasing the optical article, the diagnostic station comprising:

a diagnostic module associated with the guideway and configured to receive the article transport vehicle when the article transport vehicle is in an inspection position along the guideway, the diagnostic module comprising at least two of the following:

a grip testing substation having at least one force sensor configured for measuring a closing force of the gripping arms of the closure mechanism of the article transport vehicle in a closed position;

a pressure testing substation in communication with a source of pressurized air and configured for pressurizing and depressurizing the closure mechanism; and an optical inspection substation having at least one camera configured for capturing image data of the article transport vehicle.

2. The diagnostic station of claim 1, wherein the optical inspection station further comprises a controller having at least one processor, wherein the at least one processor is programmed or configured for determining whether the image data has at least one predetermined characteristic of the article transport vehicle.

3. The diagnostic station of claim 2, wherein, in response to determining that the image data has the at least one predetermined characteristic, the at least one processor is programmed or configured for generating at least one notification about a status of the article transport vehicle.

4. The diagnostic station of claim 2, wherein the at least one predetermined characteristic of the article transport vehicle is a presence or an absence of at least one physical feature of the article transport vehicle.

5. The diagnostic station of claim 2, wherein the at least one predetermined characteristic of the article transport vehicle is a three-dimensional position of at least one physical feature of the article transport vehicle relative to the diagnostic module.

6. The diagnostic station of claim 2, wherein the at least one predetermined characteristic of the article transport vehicle is a color of at least one of a pair of gripping arms of the closure mechanism.

7. The diagnostic station of claim 1, wherein the at least one camera comprises a first camera configured for capturing image data of a top portion of the article transport vehicle and a second camera configured for capturing image data of a side portion of the article transport vehicle.

8. The diagnostic station of claim 7, wherein the second camera is positioned at an angle of 40° to 50° relative to a longitudinal axis of the article transport vehicle extending in a direction of a pair of gripping arms of the closure mechanism.

9. The diagnostic station of claim 1, wherein the at least one force sensor is movable between a first position out of direct physical contact with a pair of gripping arms of the closure mechanism and a second position in direct physical contact with the pair of gripping arms when the gripping arms are in the closed position.

10. The diagnostic station of claim 1, wherein the grip testing substation further comprises a controller having at least one processor, wherein the at least one processor is programmed or configured for determining whether the force exerted by a pair of gripping arms of the closure mechanism in the closed position is outside a predetermined range, and wherein, in response to determining that the force is outside the predetermined range, generating at least one notification about a status of the article transport vehicle.

11. The diagnostic station of claim 1, wherein the pressure testing substation is configured for actuating a check valve of the closure mechanism.

12. The diagnostic station of claim 1, wherein the pressure testing substation is configured for pressurizing the closure mechanism of the article transport vehicle to move a pair of gripping arms from the closed position to an open position, and wherein a controller having at least one processor is programmed or configured for measuring whether a length of time during movement of the gripping arms between the closed position and the open position is outside a predetermined range.

13. The diagnostic station of claim 12, wherein, in response to determining that the length of time is outside the predetermined range, the at least one processor is programmed or configured for generating at least one notification about a status of the article transport vehicle.

14. The diagnostic station of claim 1, wherein at least one of the grip testing substation and the pressure testing substation comprises a clamping mechanism for retaining the article transport vehicle in the inspection position.

15. The diagnostic station of claim 14, wherein the clamping mechanism is movable between a first position out of direct physical contact with the article transport vehicle and a second position in direct physical contact with the article transport vehicle.

* * * * *